United States Patent
Clark

(10) Patent No.: US 6,619,675 B1
(45) Date of Patent: Sep. 16, 2003

(54) SLED APPARATUS

(76) Inventor: Dewey M. Clark, 123 Clay St., Battle Creek, MI (US) 49017

( * ) Notice: Subject to any disclaimer, the term of this patent is extended or adjusted under 35 U.S.C. 154(b) by 0 days.

(21) Appl. No.: 09/904,769

(22) Filed: Jul. 13, 2001

(51) Int. Cl.[7] .............................................. B62B 13/08
(52) U.S. Cl. ...................................... 280/21.1; 280/16
(58) Field of Search ............................ 280/21.1, 28.16, 280/17, 16, 15, 14.25, 14.26, 14.27, 845, 18, 14.28

(56) References Cited

U.S. PATENT DOCUMENTS

| | | | | |
|---|---|---|---|---|
| 826,493 A | * | 7/1906 | Dickson | 280/21.1 |
| 1,216,009 A | * | 2/1917 | Takemi | 280/21.1 |
| 1,318,747 A | * | 10/1919 | Gross | 280/21.1 |
| 1,354,909 A | * | 10/1920 | Johnson | 280/21.1 |
| 2,388,145 A | * | 10/1945 | Heagney | 280/21.1 |
| 3,326,569 A | * | 6/1967 | Leeming | 280/21.1 |
| 3,329,439 A | | 7/1967 | Gebien | |
| 3,361,436 A | | 1/1968 | Williams | |
| 3,453,000 A | * | 7/1969 | Asher | 280/21.1 |
| 3,677,568 A | * | 7/1972 | Nelson | 280/21.1 |
| 3,734,523 A | | 5/1973 | Field | |
| 3,794,341 A | * | 2/1974 | Torok | 280/21.1 |
| 3,901,526 A | * | 8/1975 | Scott et al. | 280/21.1 |
| 4,063,746 A | * | 12/1977 | Hansen | 280/21.1 |
| 4,193,608 A | * | 3/1980 | Gunderson | 280/21.1 |
| 4,243,238 A | * | 1/1981 | Johnson | 280/21.1 |
| 4,254,964 A | * | 3/1981 | Gibson | 280/21.1 |
| 4,405,140 A | | 9/1983 | Stevens | |
| D281,060 S | | 10/1985 | Appel | |
| 4,796,902 A | | 1/1989 | Capra | |
| 5,573,257 A | * | 11/1996 | Olivieri | 280/21.1 |
| 5,704,622 A | * | 1/1998 | Weekley | 280/21.1 |
| 6,139,031 A | * | 10/2000 | Wingard | 280/14.28 |

* cited by examiner

Primary Examiner—Brian L. Johnson
Assistant Examiner—Jeffrey Restifo

(57) ABSTRACT

A sled apparatus for sledding through snow covered terrain. The sled apparatus includes a rear portion including a panel having a top surface and a bottom surface. The panel has a back edge, a front edge, and a pair of side edges. A back pair of runners is attached to the bottom surface. Each one of the back pair of runners is positioned generally adjacent to and extends along one of the side edges of the panel such that the back pair of runners is orientated generally parallel to each other. A tongue is attached to and extends outwardly away from the front edge of the panel. A steering member is rotatably attached to the tongue.

1 Claim, 3 Drawing Sheets

SLED APPARATUS

BACKGROUND OF THE INVENTION

1. Field of the Invention

The present invention relates to sledding devices and more particularly pertains to a new sled apparatus for sledding through snow covered terrain.

2. Description of the Prior Art

The use of sledding devices is known in the prior art. More specifically, sledding devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 3,734,523; 3,361,436; 3,329,439; 4,405,140; 4,796,902; and U.S. Des. Pat. No. 281,060.

While these devices fulfill their respective, particular objectives and requirements, the aforementioned patents do not disclose a new sled apparatus. The inventive device includes a rear portion comprising a panel having a top surface and a bottom surface. The panel has a back edge, a front edge, and a pair of side edges. A back pair of runners is attached to the bottom surface. Each one of the back pair of runners is positioned generally adjacent to and extends along one of the side edges of the panel such that the back pair of runners is orientated generally parallel to each other. A tongue is attached to and extends outwardly away from the front edge of the panel. A steering member is rotatably attached to the tongue.

In these respects, the sled apparatus according to the present invention substantially departs from the conventional concepts and designs of the prior art, and in so doing provides an apparatus primarily developed for the purpose of sledding through snow covered terrain.

SUMMARY OF THE INVENTION

In view of the foregoing disadvantages inherent in the known types of sledding devices now present in the prior art, the present invention provides a new sled apparatus construction wherein the same can be utilized for sledding through snow covered terrain.

The general purpose of the present invention, which will be described subsequently in greater detail, is to provide a new sled apparatus apparatus and method which has many of the advantages of the sledding devices mentioned heretofore and many novel features that result in a new sled apparatus which is not anticipated, rendered obvious, suggested, or even implied by any of the prior art sledding devices, either alone or in any combination thereof.

To attain this, the present invention generally comprises a rear portion comprising a panel having a top surface and a bottom surface. The panel has a back edge, a front edge, and a pair of side edges. A back pair of runners is attached to the bottom surface. Each one of the back pair of runners is positioned generally adjacent to and extends along one of the side edges of the panel such that the back pair of runners is orientated generally parallel to each other. A tongue is attached to and extends outwardly away from the front edge of the panel. A steering member is rotatably attached to the tongue.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new sled apparatus apparatus and method which has many of the advantages of the sledding devices mentioned heretofore and many novel features that result in a new sled apparatus which is not anticipated, rendered obvious, suggested, or even implied by any of the prior art sledding devices, either alone or in any combination thereof.

It is another object of the present invention to provide a new sled apparatus which may be easily and efficiently manufactured and marketed.

It is a further object of the present invention to provide a new sled apparatus which is of a durable and reliable construction.

An even further object of the present invention is to provide a new sled apparatus which is susceptible of a low cost of manufacture with regard to both materials and labor, and which accordingly is then susceptible of low prices of sale to the consuming public, thereby making such sled apparatus economically available to the buying public.

Still yet another object of the present invention is to provide a new sled apparatus which provides in the apparatuses and methods of the prior art some of the advantages thereof, while simultaneously overcoming some of the disadvantages normally associated therewith.

Still another object of the present invention is to provide a new sled apparatus for sledding through snow covered terrain.

Yet another object of the present invention is to provide a new sled apparatus which includes a rear portion comprising a panel having a top surface and a bottom surface. The panel has a back edge, a front edge, and a pair of side edges. A back pair of runners is attached to the bottom surface. Each one of the back pair of runners is positioned generally adjacent to and extends along one of the side edges of the panel such that the back pair of runners is orientated generally parallel to each other. A tongue is attached to and extends outwardly away from the front edge of the panel. A steering member is rotatably attached to the tongue.

Still yet another object of the present invention is to provide a new sled apparatus that is maybe steered.

Even still another object of the present invention is to provide a new sled apparatus that has a foot support thereon for supporting the user of the device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
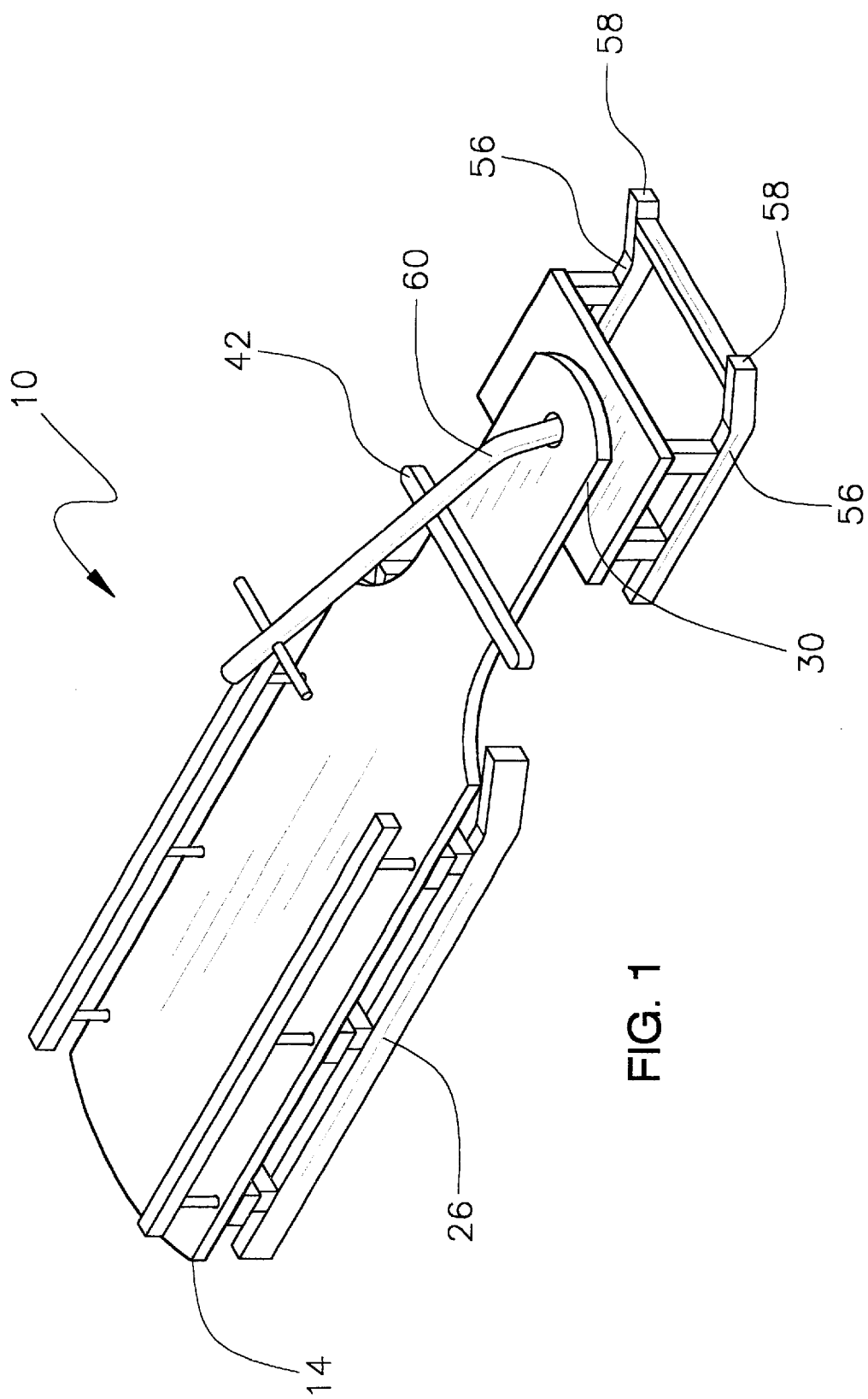
FIG. 1 is a schematic perspective view of a new sled apparatus according to the present invention.
Figure 2:
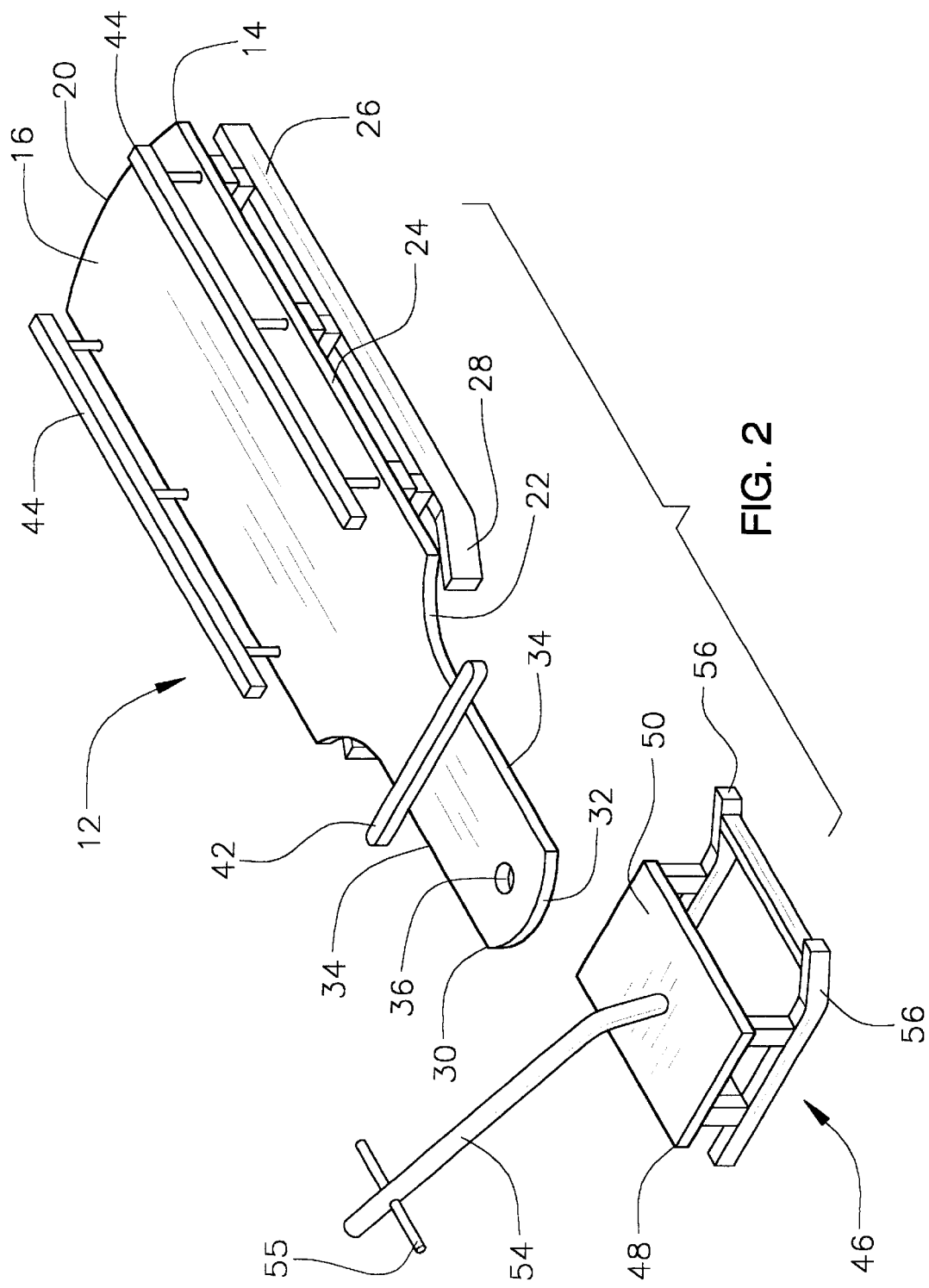
FIG. 2 is a schematic perspective view of the present invention.
Figure 3:
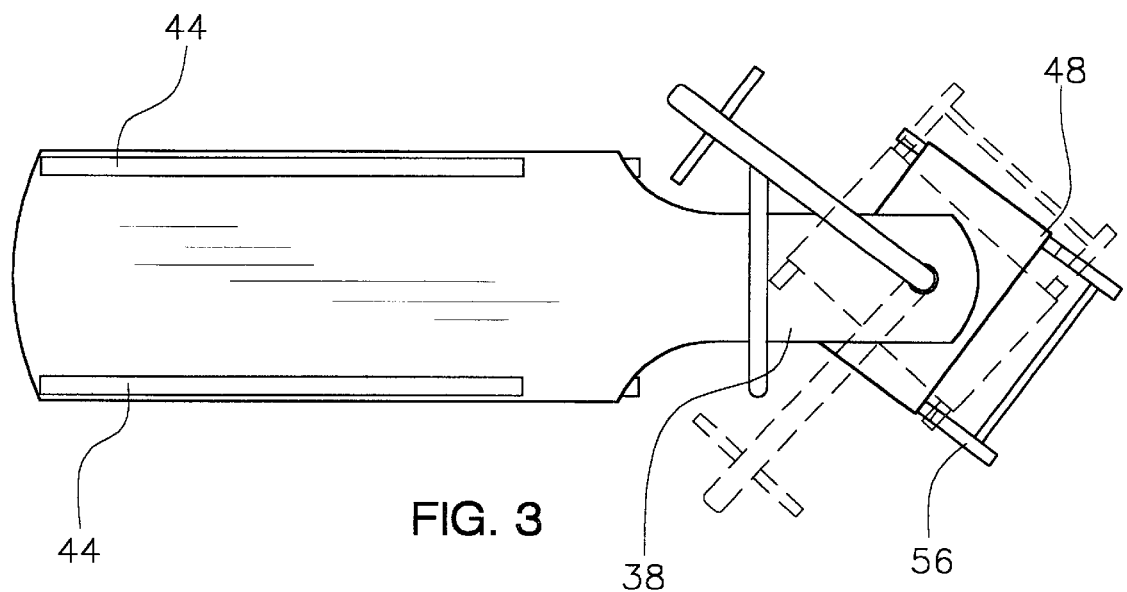
FIG. 3 is a schematic top view of the present invention.
Figure 4:
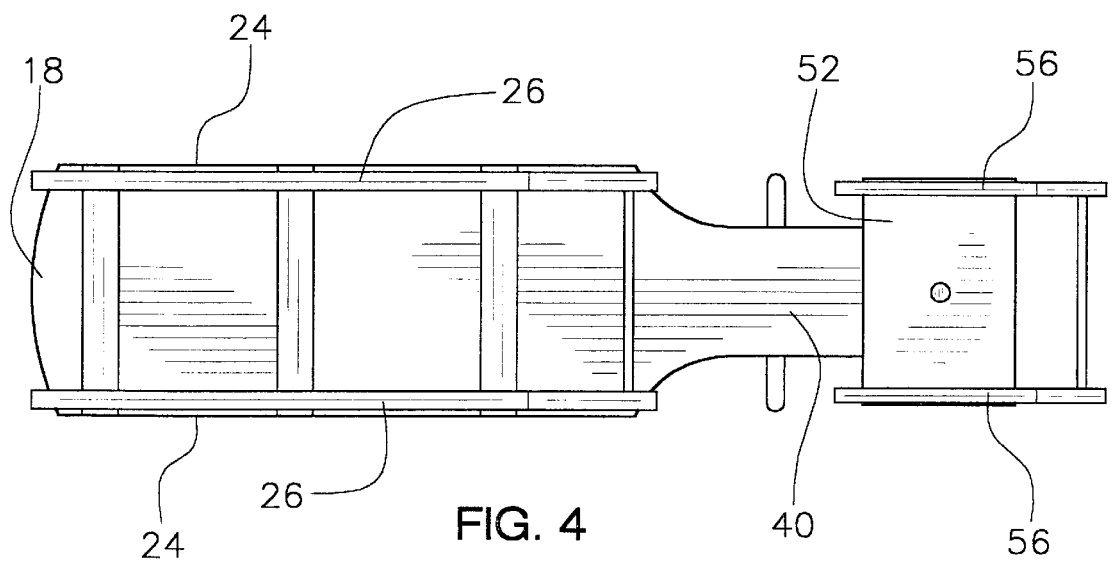
FIG. 4 is a schematic bottom view of the present invention.

With reference now to the drawings, and in particular to FIGS. 1 through 4 thereof, a new sled apparatus embodying the principles and concepts of the present invention and generally designated by the reference numeral 10 will be described.

As best illustrated in FIGS. 1 through 4, the sled apparatus 10 generally comprises a rear portion 12 including a panel 14 having a top surface 16 and a bottom surface 18. The panel 14 has a back edge 20, a front edge 22, and a pair of side edges 24. A back pair of runners 26 is attached to the bottom surface 18. Each one of the back pair of runners 26 is positioned generally adjacent to and extends along one of the side edges 24 of the panel 14 such that the back pair of runners 26 are orientated generally parallel to each other. Each of the back pair of runners 26 has a front end 28 that is preferably angled upwardly.

A tongue 30 is attached to and extends outwardly away from the front edge 22 of the panel 14. The tongue 30 has a free end 32 and a pair of outer edges 34. The tongue 30 has a width between outer edges 34 smaller than a width of the panel 14 between the side edges 24. The tongue 30 has a hole 36 therein extending through an upper side 38 and lower side 40 of the tongue 30. The hole 36 is positioned generally adjacent to the free end 32.

A bar 42 is attached to the upper side 38 of the tongue 30 and is positioned between the hole 36 and the panel 14. The bar 42 extends past each of the outer edges 34 of the tongue 30 and defines a foot support.

Each of a pair of rails 44 is attached to the top surface 16 of the panel 14. Each of the rails 44 is positioned adjacent to and generally extends along a length of one of the side edges 24.

A steering member 46 is rotatably attached to the tongue 30. The steering member 46 includes a plate 48 having a first side 50 and a second side 52. A pole 54 is attached to the first side 50 of the plate 48. The pole 54 extends upwardly through the hole 36 in the tongue 30 such that the first side 50 of the plate 48 is abutting the lower side 40 of the tongue 30. A handle 55 is attached to the pole 54 and is positioned generally adjacent to a distal end of the pole 54 with respect to the plate 48. Each of a front pair of runners 56 is attached to the second side 52 of the plate 48 and orientated generally parallel to each other. Each of the front pair of runners 56 has a front end 58 angled upwardly. The pole 54 has a bend 60 therein such that the pole 54 extends generally toward the rear portion 12 when the front pair of runners 56 are orientated generally parallel with the back pair of runners 26.

In use, the device 10 is used for sledding. The user sits on the rear portion 12 and places their feet on the bar 42 for support. The pole 54 is rotated with respect to the tongue 30 so that the front runners 56 are rotated with respect to the rear portion 12. In this manner the front runners 56 are used for steering the device 10 in the snow.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A sled device comprising:

a rear portion comprising a panel having a top surface and a bottom surface, said panel having a back edge, a front edge, and a pair of side edges, a back pair of runners being attached to said bottom surface, each one of said back pair of runners being positioned generally adjacent to and extending along one of said side edges of said panel such that said back pair of runners are orientated generally parallel to each other, each of said back pair of runners having a front end being angled upwardly;

a tongue being attached to and extending outwardly away from said front edge of said panel, said tongue having a free end and a pair of outer edges, said tongue having a smaller width between outer edges than a width of said panel between said side edge, said tongue having a hole therein extending through an upper side and lower side of said tongue, said hole being positioned generally adjacent to said free end;

a bar being attached to said upper side of said tongue and being positioned between said hole and said panel, said bar extending past each of said outer edges of said tongue and defining a foot support, said foot support being static relative to said rear portion;

a pair of rails being attached to said top surface of said panel, each of said rails being positioned adjacent to and generally extending along a length of one of said side edges;

a steering member being rotatably attached to said tongue, said steering member comprising;

a plate having a first side and a second side;

a pole being attached to said first side of said plate, said pole extending upwardly through said hole in said tongue such that said first side of said plate is abutting said lower side of said tongue, a handle being attached to said pole and being positioned generally adjacent to a distal end of said pole with respect to said plate;

a front pair of runners being attached to said second side of said plate and orientated generally parallel to each other, each of said runners having a front end angled upwardly; and wherein said pole has a bend therein whereby said pole is swingable to turn said front runners in a desired direction, said bend being such that said pole extends generally toward said rear portion when said front pair of runners are orientated generally parallel with said back pair of runners.

* * * * *